Sept. 7, 1954 W. D. KELLY 2,688,251
LIQUID LEVEL INDICATING MEANS
Filed Sept. 18, 1952 3 Sheets-Sheet 3
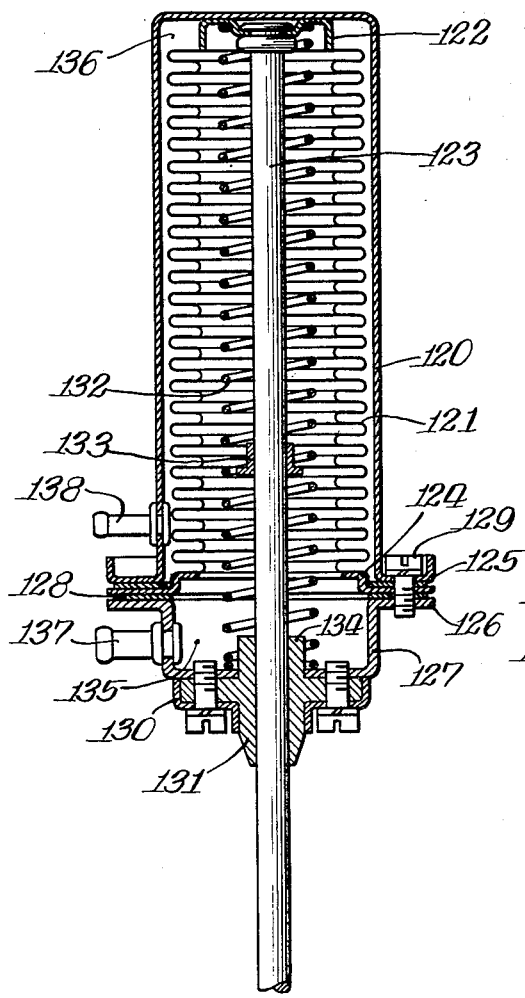
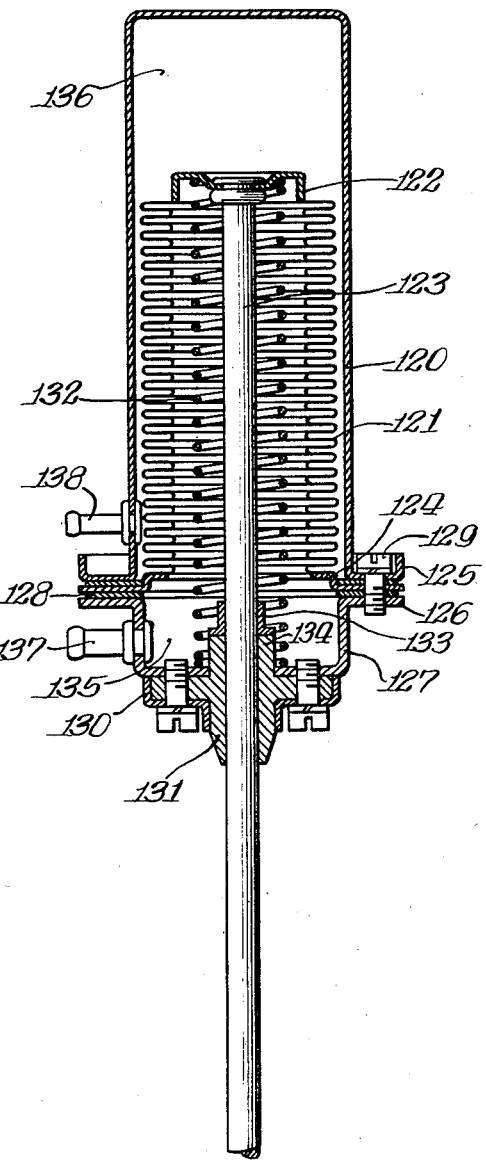
INVENTOR.
William D. Kelly,
BY
Attys.

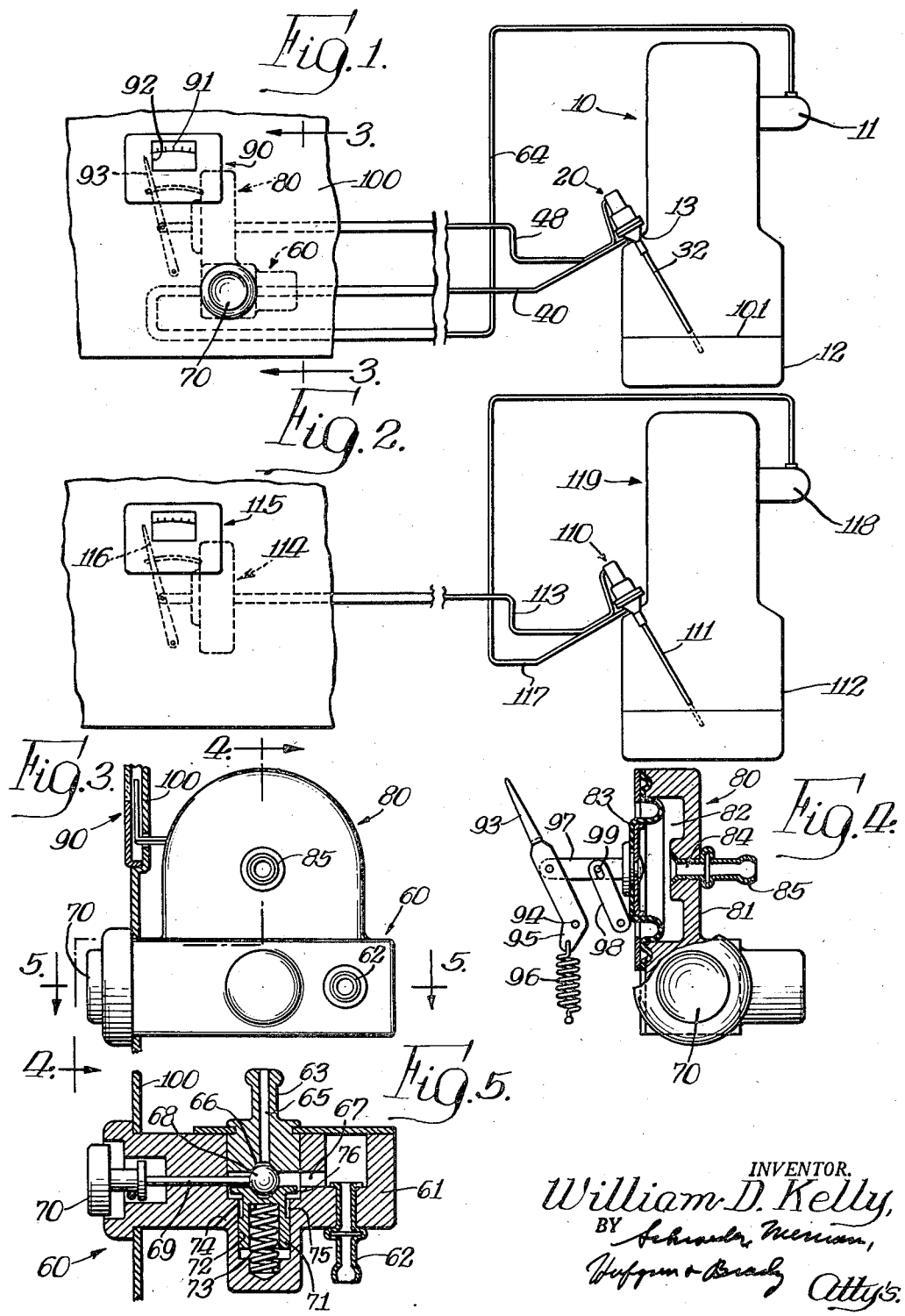

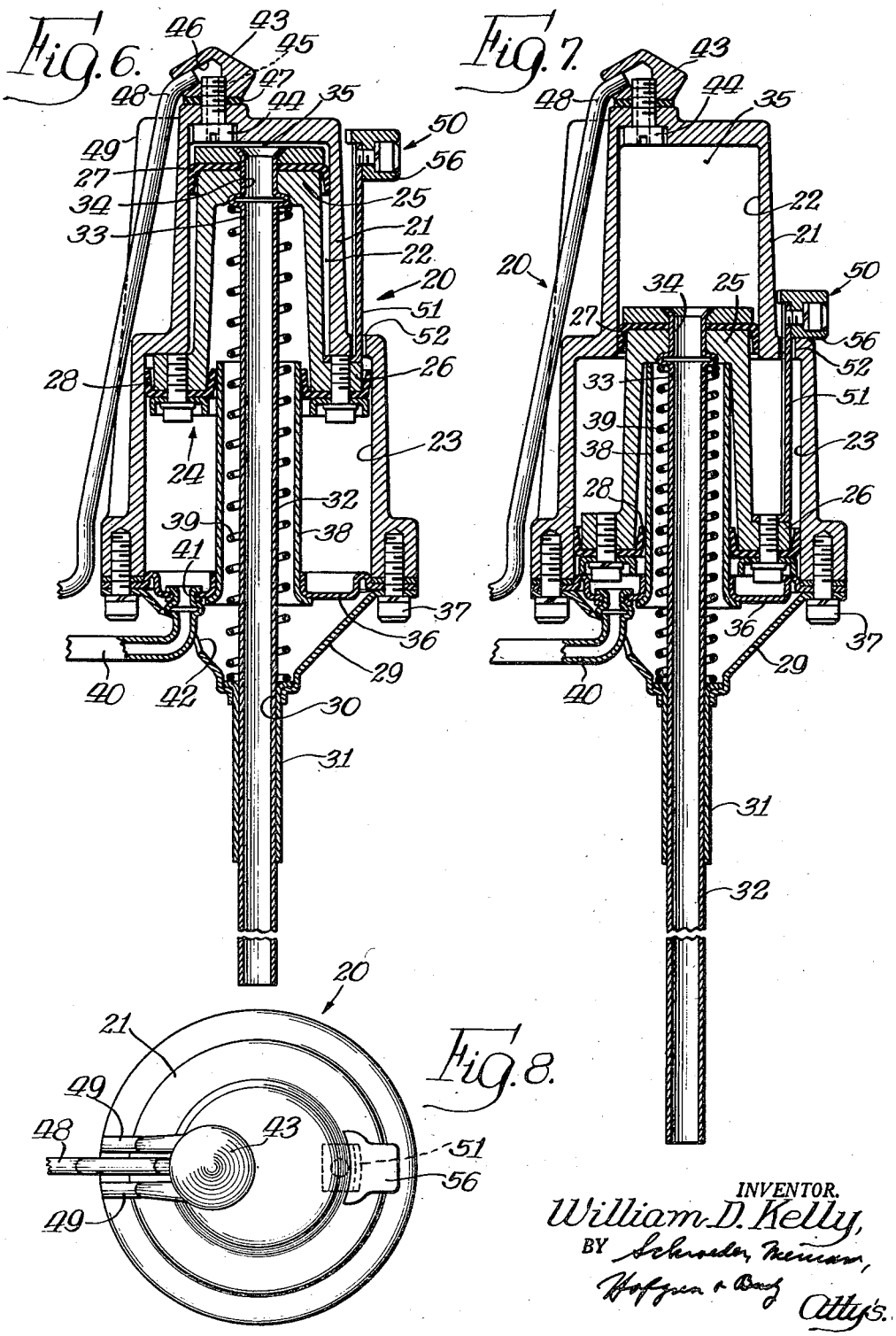

Patented Sept. 7, 1954

2,688,251

UNITED STATES PATENT OFFICE 2,688,251

LIQUID LEVEL INDICATING MEANS

William D. Kelly, Western Springs, Ill.

Application September 18, 1952, Serial No. 310,265

17 Claims. (Cl. 73—290)

This invention relates to liquid level indicating means particularly adaptable for use to provide an indication of liquid level in an enclosed compartment.

It is the general object of this invention to produce a new and improved liquid level indicating means.

While it will be readily apparent to those skilled in the art that the principles of the liquid level indicating means hereinafter to be described may be utilized for indicating liquid level in a variety of applications, the invention is herein shown as embodied in a device for indicating the level of liquid in the crankcase of an internal combustion engine.

At the present time most internal combustion engines are provided with a crankcase sump for lubricating oil together with a lubricating pump for circulating the oil through the crankshaft of the engine and the bearings associated therewith. The lubricating oil serves not only to lubricate the various moving parts in the crankcase of an engine, but also as a cooling medium for conducting heat away from the bearings of the engine. Thus the lubricating oil has a dual function, both of which must be fulfilled by the lubricant in order to preserve and lengthen the life of the engine. Proper circulation of the oil may be indicated to the operator of the engine by providing a suitable oil pressure gauge connected to the discharge side of the oil pump and serving to indicate whether sufficient oil pressures are generated by the pump to force the lubricant through the various passages provided in the crankshaft, bearings, connecting rods, etc. Even though the oil is properly circulated, however, a sufficient reservoir of oil must be provided to give the lubricant an opportunity to lose the heat it has picked up and carried away from the bearings of the engine. Thus not only the pressure of the lubricant but also its quantity in the sump of the crankcase is important.

For the most part the quantity of oil in the crankcase of the engine may be measured only through the use of a dip-stick provided on the engine which extends into the crankcase and is inscribed with suitable graduations to indicate the level of the oil in the sump. The dip-stick must be removed and wiped clean and then reinserted through the dip-stick opening and again removed in order to determine the quantity of oil in the crankcase. If the internal combustion engine is on a vehicle this necessitates the stopping of the vehicle in order to check the quantity of oil in the crankcase.

According to this invention, however, there is provided a system wherein the oil level in the crankcase may be determined without the necessity of opening the hood of the vehicle and following out the procedure described above. Thus there may be provided an indicating means on the instrument panel of the vehicle which may either automatically or at the will of the operator indicate the level of oil in the crankcase without the necessity of stopping the engine or, if the engine is on a vehicle, of stopping the vehicle.

One of the features of the present invention is the provision of an oil level indicating means which includes a tube immersible in the oil in the crankcase together with means for drawing oil up into the tube, with the amount of oil so drawn into the tube being determined by the oil level within the crankcase. The amount of oil drawn up into the tube being correlated with the oil level is utilized to determine such level and to give a visual indication thereof.

A further feature of the invention is the provision of an oil level indicating means which includes a tube connected at one end to an expandable chamber and opening at the other end to the interior of the crankcase together with means for simultaneously moving the end of the tube within the crankcase downwardly toward the surface of the oil therein and expanding the chamber. Thus gas or air is drawn into the chamber as the tube moves downwardly until the end of the tube contacts and is immersed in the oil and thereafter expansion of the chamber draws oil into the tube. Inasmuch as the chamber is provided with a cross sectional area many times that of the tube, a sizable column of oil may be drawn into the tube which operates to reduce the pressure in the chamber, with the amount of pressure reduction being directly related to the height of the column of oil in the tube. Pressure responsive means are connected to the chamber for measuring the partial vacuum therein created by the column of oil and utilized to give a visible indication of oil level.

Other and further features of the invention will be readily apparent from the following description and drawings, in which:

Fig. 1 is a diagrammatic view showing an internal combustion engine associated with the oil level indicating means of this invention;

Fig. 2 is a view like Fig. 1 of a modified form of the invention;

Fig. 3 is an enlarged view taken along line 3—3 of Fig. 1;

Fig. 4 is a sectional view taken along line 4—4 of Fig. 3;

Fig. 5 is a sectional view taken along line 5—5 of Fig. 3;

Fig. 6 is an enlarged vertical sectional view of a portion of the apparatus of the invention showing the piston therein in one position;

Fig. 7 is a view like Fig. 6 showing the piston in another position;

Fig. 8 is a top plan view of the apparatus shown in Fig. 6;

Fig. 9 is a view like Fig. 6 of a modified form of the invention; and

Fig. 10 is a view like Fig. 9 showing the device in actuated position.

While this invention is susceptible of embodiments in many different forms, there are shown in the drawings and will herein be described in detail two specific embodiments, with the understanding that the present disclosure is to be considered as an exemplification of the principles of the invention and is not intended to limit the invention to the embodiments illustrated. The scope of the invention will be pointed out in the appended claims.

For the purpose of exemplary disclosure the apparatus and methods of the invention are shown as used in conjunction with an internal combustion engine such as the engine 10 of an automobile. The engine is provide with an intake manifold 11, a crankcase 12 and a dip-stick opening 13 normally accommodating the usual metal rod for measuring oil level. One part 20 of the apparatus of this invention is intended to replace the dip-stick and is so proportioned as to seat in the dip-stick opening without the necessity of modification of the engine. The part 20 includes a casing 21 shaped as to form therein a first cylinder 22 and a second cylinder 23 coaxial with the first cylinder but somewhat larger in diameter. A compound piston 24 is mounted in the casing so as to have a first piston portion 25 reciprocable in the first cylinder and a second piston portion 26 reciprocable in the second cylinder. To provide an air-tight seal between the piston portions and their associated cylinder the piston portion 25 is provided with a cup-shaped gasket 27 of resilient material, such as nylon or synthetic rubber, and the lower piston portion is provided with an annular channel-shaped gasket 28 of similar material.

Fixed to the lower portion of the casing is a tapered seating member 29 proportioned to seat in the dip-stick opening 13. The seat 29 is provided with a central opening 30 in which is secured a tube 31 serving as a guide for a movable tube 32 which extends into the casing 21. The upper end 33 of the tube 32 is connected to the piston portion 25 and aligned with an opening 34 formed therein so as to be in communication with a chamber 35 defined by the portion of the cylinder 22 on the side of the piston 25 opposite that to which the tube 32 is attached.

The lower portion of the lower cylinder 23 is closed off by a bottom plate 36 secured to the casing 21 by screws 37 which also serve to retain the seating member 29 in position, with the bottom plate 36 supporting an internal tube 38 positioned in the cylinder 23. Located within the tube 38 and extending from the opening 30 to the piston 25 is a compression spring 39, the coils of which encircle the movable tube 32.

The principal purpose of the second piston and cylinder device including the portions 23 and 26 is to serve as a motor for moving the upper piston portion 25 downwardly, thus to increase the volume of the chamber 35. Inasmuch as the normal internal combustion engine is provided with a source of suction comprising the intake manifold, such suction is utilized for effecting movement of the upper piston.

For this purpose a suction line 40 is connected to an opening 41 extending through the bottom plate 36 and opening into the cylinder 23 and extends through a relatively large opening 42 in the seating member 29, with the other end of the suction line 40 being adapted to be connected by valve means hereinafter to be described to the intake manifold of the engine.

A cylindrical cap 43 is secured to the upper portion of the casing by means of a screw 44 having an opening 45 therein establishing communication between the chamber 35 and an interior chamber 46 of the cap. A gasket 47 is interposed between the cap and the casing to effect an air-tight seal. Connected to the chamber 46 is a gauge line 48 which extends downwardly along the casing between fins 49 integrally formed thereon to the indicating means hereinafter to be described.

Manual means 50 are also provided for moving the upper piston portion 25 downwardly to effect measurement of the oil level. The manual means may be utilized when the engine is stopped and thus where no intake manifold suction is available. The manual means includes an arcuately-shaped rod 51 extending downwardly through an opening 52 in the casing and into the lower cylinder 23 wherein it is attached to the lower piston 26. The means 50 is provided with a handle portion 56 which may be grasped by the fingers and downward force exerted on the handle portion will cause the lower piston 26 to be moved downwardly to effect measurement.

Manually operable valve means are provided to connect the suction line 40 to the intake manifold to apply suction to the lower cylinder 23. As shown in Fig. 5 the valve means 60 includes a casing 61 having a nipple 62 to be connected to the suction line 40 and a second nipple 63 to be connected to a second line 64 in turn connected to the intake manifold. The casing is formed with a passage 65 communicating at one end with the nipple 63 and at the other end with an enlarged chamber 66 in the interior of the casing. A second passage 67 serves to establish communication between the chamber 66 and the nipple 62. A ball valve 68 is seated in the enlarged portion 66 and connected to one end of a rod 69 to the other end of which is connected a button 70 for moving the valve 68 in response to manual pressure.

A piston 71 is reciprocable in the casing 61 in a cylinder 72 formed therein. A spring 73 is provided for constantly urging the piston downwardly against the ball valve 68.

Inasmuch as the conduit 64 is constantly connected to the intake manifold and thus creates suction, means are provided for venting the suction except at the times when it is to be utilized for actuating the piston 24. To this end the casing 61 is provided with a passage 74 opening at one end to the atmosphere and at the other end to an annular groove 75 formed in the cylinder 72. The annular groove is open at its inner end and thus is in communication with the enlarged chamber 66 which in turn is in communication with the passage 65 by reason of the fact that the portion of the chamber 66 at the inner end of the passage 65 does not conform exactly to the shape of the ball 68. When it is desired to apply suction to the cylinder 23 the button 70 may be pushed inwardly. Such movement of the button unseats the valve 68 and simultaneously moves the piston 71 outwardly against the compression of the spring. Such outward movement of the piston causes a flange portion 76 thereof to seat against the lower portion of the cylinder 72 and thus block off the annular groove 75 while at the same time establishes communication between the passages 65 and 67 and thus to apply suction to the cylinder 23.

Formed as a part of the manual valve 60 is a pressure responsive means 80 which includes a casing 81 (Fig. 4) having a chamber 82 formed therein closed on one side by a flexible diaphragm 83 (such as nylon or the like) with the chamber being provided with an opening 84 in its wall opposite the diaphragm which communicates with a nipple 85 connected to the gauge line 48.

Indicating means 90 are associated with the pressure responsive means and includes an indicator having an inscribed face 91 visible through a window 92 as is an indicating finger 93. The finger 93 is pivoted at 94 to a suitable fixed pivot and is provided at its lower end with an offset arm 95 to which is connected a spring 96 for constantly urging the finger to the position shown in Fig. 4. A rigid member 97 is secured at one end to the diaphragm 83 and is pivotally connected at its other end to the finger 93. To steady the member 97 a pivotally mounted support arm 98 is provided which is pivotally connected to the member 97 through the pin arrangement 99 shown.

In operation the valve means 60 and its associated pressure responsive means 80 and indicating means 90 are preferably mounted on the instrument panel 100 of a vehicle. When it is desired to ascertain the amount of oil in the crankcase the button 70 is pushed inwardly so as to establish communication between the lines 64 and 40 and thus to apply vacuum to the cylinder 23. Such vacuum causes the compound piston to move downwardly carrying the tube 32 from an initial position illustrated in the solid lines in Fig. 1 and shown in Fig. 6, wherein the end of the tube is positioned slightly above the level 101 of oil in the crankcase, to the dotted line position shown in Fig. 1 where the open end of the tube is below the oil level. As the tube 32 is moved downwardly the chamber 35 is expanded but while the lower end of the tube is still above the oil level, the air within the crankcase is drawn into the tube and into the chamber 35. As soon as the lower end of the tube contacts the surface of the oil and is thereafter immersed therein, oil rather than air is drawn into the tube. As the chamber 35 has a cross sectional area many times that of the tube 32, a sizable column of oil is drawn into the tube 32 and the hydrostatic head thus formed creates a partial vacuum within the chamber 35. The amount of vacuum created in the chamber 35 is of course dependent upon the height of the column of oil drawn into the tube 32 which in turn is dependent upon the oil level. If the oil level is low the tube will move downwardly through a relatively large movement before the lower end is immersed in the oil and hence a small column of oil will be drawn into the tube. If the oil level is high the lower end of the tube will be immersed in the oil after comparatively short movement, and thus by the time the piston has completed its downward movement and has assumed the position of Fig. 7, a relatively high column of oil will be drawn into the tube.

The partial vacuum created within the chamber 35 is communicated to the chamber 82 through the gauge line 48 and thus serves to draw the diaphragm 83 to the right (as shown in Fig. 4) a distance commensurate with the degree of vacuum in the chamber 35. Such rightward movement of the diaphragm of course pivots the indicating finger 93 to the right to a position across the inscribed face 91 to indicate the quantity of oil.

In the normal automobile the oil level varies about an inch and a quarter between the full level and the level wherein the quantity of oil is approximately one quart short. Thus it is preferable that the length of the cylinder 22 be approximately one and one quarter inch so that the tube 32 is moved through that distance from the position shown in Fig. 6 to that of Fig. 7. Of course if the oil level is more than one quart down the tube will not contact the surface and hence no vacuum will be created in the chamber 35 and the indicator 93 will remain in the position shown in Fig. 1 indicating a need of oil. As most dip-stick openings are approximately three eighths inch in diameter, the tube 32 may advantageously have a diameter of one quarter inch and the seating member 29 is proportioned so as to have a firm fit in the dip-stick opening.

It is of course unnecessary that the seating member 29 sealingly engage the dip-stick opening inasmuch as it is immaterial whether or not gas leaks beyond the seat. If desired the lower end of the tube 32 may be inscribed with the usual markings so that it may be used in the same manner as the ordinary dip-stick.

In the embodiment of the invention just described a measure or indication of oil level is available to the operator at any time when the engine is running, regardless of whether the vehicle is in motion or not. To provide an accurate indication the push button 70 should not be depressed unless the vehicle is running on a straight and level road. If the vehicle is rounding a sharp turn at high speed the oil in the crankcase will not be level and thus a false or erroneous indication will result.

In the second form of the invention shown in Fig. 2 an indication of oil level is given automatically as soon as the engine is started. For this purpose the portion of the apparatus 110 to be positioned in the dip-stick opening is fabricated in the same manner as the device shown in Figs. 6 and 7 of the previous embodiment and is provided with a tube 111 movable downwardly toward the level of oil in the crankcase sump 112. The expandable chamber is connected through a conduit 113 to pressure responsive means 114 similar to the means 80 previously described which in turn is connected to an indicating means 115 provided with an indicating finger 116. A second conduit 117 connects the lower cylinder in the device 110 with the intake manifold 118 of the internal combustion engine 119 with which it is associated. In this apparatus as soon as the engine is started vacuum is applied through the conduit 117 to the lower cylinder to draw the compound piston downwardly and thus to create a partial vacuum in the chamber as soon as the tube 111 becomes immersed in the oil. Such partial vacuum is immediately transmitted to the pressure responsive means 114 and results in movement of the indicating finger to indicate oil level. Thus as soon as the engine is started visual indication is given to the operator of the amount of oil present in the crankcase. Such indications are only available when the engine is started as leakage, etc. will introduce errors into the indication after the engine has been operated for some time.

Referring to the modified form of the invention shown in Figs. 9 ad 10, there is provided a cup-shaped casing 120 enclosing a metallic bellows 121 closed in turn at its upper end by an integral cap 122 which carries a tube 123, the open end of which extends through the cap 122. The bottom end of the bellows 121 is soldered to an annular washer 124 which is held between a flange 125 provided at the lower portion of the casing and a second flange 126 provided on a lower closure member 127. A gasket 128 is provided between the washer and the flange 126 to effect an air-tight seal and the parts are held in assembled relationship by the screws 129.

Secured to the lower closure member 127 by a flanged cup-shaped member 130 is a bushing 131 which may be of nylon, neoprene or other material provided with an opening through which the tube 123 extends. A spring 132 encircles the tube 123 and bears at one end against the underside of the cap 122 and at the other end against the inner surface of the lower closure 127. Preferably a stop 133 is secured to the rod adapted to seat against an annular portion 134 of the bushing when the tube has been fully depressed.

The interior of the bellows and the interior of the lower closure 127 provide a chamber 135 which may be connected through a nipple 137 to a source of vacuum, such as the engine manifold, to evacuate the chamber 135 and thus cause compression of the bellows, which compression serves to move the tube 123 outwardly and toward the surface of the oil in the crankcase. The vacuum may be applied to the chamber 135 either upon engine start up, if the device in Figs. 9 and 10 is arranged as shown in Fig. 2, or the application may be manually controlled if the device is connected as shown in Fig. 1. In either event the bellows will be moved from the position shown in Fig. 9 to that shown in Fig. 10 upon the evacuation of the chamber 135. Such collapsing movement of the bellows serves to expand the chamber 136 defined between the exterior surface of the bellows and the interior surface of the casing 120, which expansion will initially draw air into the chamber 136 until the lower end of the tube contacts the surface of the oil and subsequently to draw oil into the tube. The weight of the oil in the tube serves to create a partial vacuum in the chamber 136, which change in pressure may be transmitted through a tube connected to a nipple 138 opening into the chamber 136 and to an indicating means such as those previously described.

It will be noted that in all embodiments of the invention the apparatus will "fail safe." That is to say, the apparatus will give an indication of adequate oil level only when all parts thereof are functioning properly. Should breakage occur in any of the conduits or should the various gaskets and seals provided develop leaks, no partial vacuum will be created in the chambers 35 or 135 and hence the indicating means will not indicate the presence of oil. Because of the fact that the apparatus will not give an indication of oil when it is not functioning properly, damage to the engine which might occur through failure to add oil in reliance on a false indication may be avoided.

It will also be noted that the various portions of the apparatus such as the casings 21, 61, 81, and 120 may readily be formed of inexpensive material such as plastics and the like by common injection molding processes and thus the device is relatively inexpensive to manufacture. Furthermore, the indicating means, which may take a variety of forms, as shown herein is one which is readily adaptable to the style of other gauges normally applied on vehicles or in conjunction with internal combustion engines.

While the invention has been described in its preferred embodiments and is shown as used in conjunction with automotive engines, no unnecessary limitations should be construed therefrom as modifications and other applications of the invention will be apparent to those skilled in the art.

I claim:

1. A liquid level measuring device comprising a movably mounted tube, means for moving the tube toward the surface of the liquid, a chamber, means for expanding the chamber during movement of the tube in proportion to the extent of movement of the tube, said tube being connected to the chamber to admit gas thereinto as the chamber expands until the tube reaches the liquid level and thereafter to draw liquid into the tube to create a partial vacuum in the chamber, and means for measuring the partial vacuum thus created in the chamber.

2. A liquid level measuring device comprising a tube mounted for movement toward and away from the surface of the liquid, a chamber, means for expanding the chamber during movement of the tube in proportion to the extent of movement of the tube, said tube being connected to the chamber whereby to draw liquid into the tube during expansion of the chamber when the tube is immersed in the liquid, and means for measuring the amount of liquid drawn into the tube.

3. A liquid level measuring device comprising a cylinder, a piston reciprocable in the cylinder, a tube connected to the piston and movable therewith, with the tube extending longitudinally of the cylinder on one side of the piston and communicating at one end to the portion of the cylinder on the other side of the piston, means for moving the piston in one direction to move the other end of the tube toward and into the liquid thereby to admit gas into said portion of the cylinder until the tube reaches the liquid level and thereafter to draw liquid into the tube to create a partial vacuum in said portion of the cylinder, and means responsive to said partial vacuum for providing an indication of liquid level.

4. A liquid level measuring device comprising a cylinder, a piston reciprocable in the cylinder, a tube connected to the piston and movable therewith, with the tube extending longitudinally of the cylinder on one side of the piston and communicating at one end to the portion of the cylinder on the other side of the piston, means for moving the piston in one direction to move the other end of the tube toward and into the liquid thereby to admit gas into said portion of the cylinder until the tube reaches the liquid level and thereafter to draw liquid into the tube, and means for providing an indication of liquid level in accordance to the amount of liquid drawn into the tube.

5. A liquid level measuring device comprising a casing, a first piston and cylinder device and a second piston and cylinder device in the casing, means connecting the pistons together, a tube connected to the piston in the first device and movable therewith with the tube extending longitudinally of the cylinder of said first device on one side of the piston therein and opening at one end to the portion of the cylinder on the other side of the piston, means for applying a vacuum to the cylinder of the second device to move the pistons in one direction to move the other end of the tube toward and into the liquid thereby to admit gas into said portion of the cylinder of the first device until the tube reaches the liquid level and thereafter to draw liquid into the tube to create a partial vacuum in said ptortion of the cylinder, and means connected to said portion of the cylinder and responsive to said partial vacuum for providing an indication of liquid level.

6. The liquid level measuring device of claim 5 including manually operable means having a portion accessible exteriorly of the casing and connected to the piston of the second device for manually moving the pistons in said direction.

7. A liquid level measuring device comprising a casing, a first piston and cylinder device and a second piston and cylinder device in the casing, means connecting the pistons together, a tube connected to the piston in the first device and movable therewith with the tube extending longitudinally of the cylinder of said first device on one side of the piston therein and opening at one end to the portion of the cylinder on the other side of the piston, selectively operable means for connecting the cylinder of the second device to a source of vacuum to move the pistons in one direction to move the other end of the tube toward and into the liquid thereby to admit gas into said portion of the cylinder of the first device until the tube reaches the liquid level and thereafter to draw liquid into the tube to create a partial vacuum in said portion of the cylinder, and means connected to said portion of the cylinder and responsive to said partial vacuum for providing an indication of liquid level.

8. A device for measuring the oil level in the crankcase of an internal combustion engine comprising a casing, a cylinder in the casing, a piston reciprocable in the cylinder, a tube connected to the piston and movable therewith, with the tube extending longitudinally of the cylinder on one side of the piston and communicating at one end to the portion of the cylinder on the other side of the piston, means for supporting the casing on the engine to position the tube with the other end thereof above the normal oil level in the crankcase, means for moving the piston in one direction to move said other end of the tube downwardly toward and into the oil thereby to admit gas into said portion of the cylinder and thereafter to draw oil up into the tube to create a partial vacuum in said portion, and means connected to said portion of the cylinder and responsive to said partial vacuum for providing an indication of oil level.

9. A device to be positioned in the dip-stick opening of an internal combustion engine to provide a measuring device for the oil level in the crankcase of the engine comprising a casing, a cylinder in the casing, a piston reciprocable in the cylinder, a tube connected at one end to one end of the cylinder and movably mounted on the casing, means connecting the tube to the piston for movement therewith, positioning means on the casing proportioned to seat in the dip-stick opening to position the tube with the other end thereof above the normal oil level in the crankcase, means for moving the piston in one direction to move said other end of the tube downwardly toward and into the oil thereby to admit gas into said end of the cylinder and thereafter to draw oil up into the tube to create a partial vacum in said end of the cylinder, and means connected to said end of the cylinder and responsive to said partial vacuum for providing an indication of oil level.

10. A device for measuring the oil level in the crankcase of an internal combustion engine comprising a casing, a cylinder in the casing, a piston reciprocable in the cylinder, a tube connected at one end to one end of the cylinder and movably mounted on the casing, means connecting the tube to the piston for movement therewith, means for supporting the casing on the engine to position the tube with the other end thereof above the normal oil level in the crankcase, means for moving the piston in one direction to move said other end of the tube downwardly toward and into the oil thereby to admit gas into said end of the cylinder and thereafter to draw oil up into the tube to create a partial vacuum in said end of the cylinder, and means connected to said end of the cylinder and responsive to said partial vacuum for providing an indication of oil level.

11. A device for measuring the oil level in the crankcase of an internal combustion engine comprising a casing, a cylinder in the casing, a compound piston reciprocable in the cylinder, a tube connected at one end to one end of the cylinder and movably mounted on the casing, means connecting the tube to the piston for movement therewith, means for supporting the casing on the engine to position the tube with the other end thereof above the normal oil level in the crankcase, means for connecting the other end of the cylinder to the engine manifold to partially evacuate said other end of the cylinder to move the piston in one direction and to move said other end of the tube downwardly toward and into the oil thereby to admit gas into the portion of the cylinder on said other side of the piston and thereafter to draw oil up into the tube to create a partial vacuum in said portion of the cylinder, and means connected to said portion of the cylinder and responsive to said partial vacuum for providing an indication of oil level.

12. A device for measuring the oil level in the crankcase of an internal combustion engine comprising a casing, a cylinder in the casing, a compuond piston reciprocable in the cylinder, a tube connected at one end to one end of the cylinder and movably mounted on the casing, means connecting the tube to the piston for movement therewith, means for supporting the casing on the engine to position the tube with the other end thereof above the normal oil level in the crankcase, conduit means connecting the other end of the cylinder to the engine manifold, manually actuable valve means controlling said conduit means and operating when actuated to effect partial evacuation of said other end of the cylinder to move the piston in one direction and to move said other end of the tube downwardly toward and into the oil thereby to admit gas into the portion of the cylinder on said other side of the piston and thereafter to draw oil up into the tube to create a partial vacuum in said portion of the cylinder, and means connected to said portion of the cylinder and responsive to said partial vacuum for providing an indication of oil level.

13. A device to be positioned in the dip-stick opening of an internal combustion engine to provide a measuring device for the oil level in the crankcase of the engine comprising a casing, a first and a second cylinder formed in the casing with the second cylinder being coaxial with and larger than the first cylinder, a first piston reciprocable in the first cylinder, a second piston reciprocable in the second cylinder and connected to the first piston, a tube having a diameter substantially less than the diameter of the first portion, said tube being connected at one end to one side of the first piston and extending axially of the cylinders to space the other end of the tube exteriorly of the casing, said first piston having an opening therein establishing communication between the portion of the first cylinder on the other side of the first piston and the tube, positioning means on the casing proportioned to seat in the dip-stick opening to position said other end of the tube above the normal oil level in the crankcase, means for connecting the second cylinder to the engine manifold to partially evacuate the second cylinder to move the pistons in one direction and thereby to move said other end of the tube downwardly toward and into the oil thereby to admit gas to the portion of the first cylinder on the other side of the piston therein and thereafter to draw oil up into the tube to create a partial vacuum in said portion of the cylinder, and means connected to said portion of the cylinder and responsive to said partial vacuum for providing an indication of oil level.

14. A device to be positioned in the dip-stick opening of an internal combustion engine to provide a measuring device for the oil level in the crankcase of the engine comprising a casing, a first and a second cylinder formed in the casing with the second cylinder being coaxial with and larger than the first cylinder, a compound hollow piston having a first portion slidably engaging the walls of the first cylinder and a second portion slidably engaging the walls of the second cylinder, a tube carried by the piston and communicating at one end with the portion of the first cylinder on one side of the first piston portion, said tube extending axially of the cylinders to space the other end of the tube exteriorly of the casing, positioning means on the casing proportioned to seat in the dip-stick opening to position said other end of the tube above the normal oil level in the crankcase, a manually actuatable valve, conduit means controlled by the valve for connecting the second cylinder to the engine manifold to partially evacuate the second cylinder to move the piston in one direction and thereby to move said other end of the tube downwardly toward and into the oil, thereby to admit gas to said portion of the first cylinder and thereafter to draw oil up into the tube to create a partial vacuum in said portion, a diaphragm chamber, a diaphragm in the chamber and movable in response to pressure changes therein, means connecting the diaphragm chamber to said portion of the first cylinder, and movable indicating means connected to the diaphragm and movable therewith to indicate said oil level.

15. The method of determining the level of a liquid which comprises moving a tube at a constant rate through a predetermined distance generally downwardly toward and into the liquid from an initial position above the surface of the liquid, continuously evacuating the tube only during the movement thereof and at a constant rate to draw gas into the member during its initial movement and then to draw liquid into the member, and utilizing the height of the column of liquid so drawn into the tube to determine said level.

16. A liquid level measuring device comprising a casing, a bellows in the casing and sealed at one end thereto to divide the casing into a motor chamber and a measuring chamber, a tube connected to one end of the bellows and opening into the measuring chamber, means for applying a vacuum to the motor chamber to collapse the bellows whereby to advance the other end of the tube toward and into the liquid to admit gas into the measuring chamber until said end of the tube reaches the liquid level and thereafter to draw liquid into the tube to create a partial vacuum in said measuring chamber, and means responsive to said partial vacuum for providing an indication of liquid level.

17. A liquid level measuring device comprising a casing, a collapsible member in the casing and sealingly secured thereto to divide the casing into a motor chamber and a measuring chamber, a tube connected to the collapsible member and opening at one end into the measuring chamber, means normally maintaining the collapsible member in expanded condition to maintain the other end of the tube above the level of the liquid, means for applying a vacuum to the motor chamber to collapse said member to move said other end of the tube toward and into the liquid thereby to admit gas into the measuring chamber until the tube reaches the liquid level and thereafter to draw liquid into the tube to create a partial vacuum in said measuring chamber, and means responsive to said partial vacuum for providing an indication of liquid level.

References Cited in the file of this patent

UNITED STATES PATENTS

| Number | Name | Date |
|---|---|---|
| 1,383,866 | Shephard | July 5, 1921 |
| 1,943,207 | Cummings | Jan. 9, 1934 |
| 2,305,102 | O'Neil | Dec. 15, 1942 |

FOREIGN PATENTS

| Number | Country | Date |
|---|---|---|
| 333,673 | France | Aug. 21, 1930 |